(12) United States Patent
Hangleiter

(10) Patent No.: US 6,419,430 B2
(45) Date of Patent: Jul. 16, 2002

(54) HOLDER FOR COLLAR OF WORKPIECE OR TOOL

(75) Inventor: Eugen Hangleiter, Hermaringen (DE)

(73) Assignee: Rohm GmbH, Sontheim (GB)

( * ) Notice: Subject to any disclaimer, the term of this patent is extended or adjusted under 35 U.S.C. 154(b) by 63 days.

(21) Appl. No.: 09/737,020

(22) Filed: Dec. 14, 2000

(30) Foreign Application Priority Data

Dec. 24, 1999 (DE) ..................................... 299 22 642 U

(51) Int. Cl.[7] ................................................. B23C 5/26
(52) U.S. Cl. .................... 409/233; 279/137; 408/239 R; 408/240
(58) Field of Search ................................ 409/233, 232; 279/2.04, 2.03, 2.02, 137, 23.1, 2.14, 2.15, 900; 408/239 R, 239 A, 240

(56) References Cited

U.S. PATENT DOCUMENTS

| | | | |
|---|---|---|---|
| 3,583,714 A | * 6/1971 | Weltzer et al. | ............... 279/137 |
| 4,540,187 A | * 9/1985 | Morawski et al. | .......... 279/2.04 |
| 4,958,968 A | * 9/1990 | von Haas et al. | ....... 408/239 R |
| 5,346,344 A | 9/1994 | Kress | |
| 5,409,322 A | * 4/1995 | Horikawa et al. | .......... 409/233 |
| 5,489,167 A | 2/1996 | Hangleiter | |
| 5,860,776 A | * 1/1999 | Sato et al. | ................... 409/233 |

FOREIGN PATENT DOCUMENTS

| | | |
|---|---|---|
| DE | 41 38 974 | 6/1993 |
| DE | 4138974 | 6/1993 |
| DE | 296 23 092 | 11/1997 |
| EP | 0471197 | 2/1992 |
| EP | 0901859 | 3/1999 |

OTHER PUBLICATIONS

"Kegel–Hohlschafte Mit Plananlage"; Hohlschaft Din 69893–HSK–D50, 1996–07; 13 Pages.

* cited by examiner

Primary Examiner—A. L. Wellington
Assistant Examiner—Erica E Cadugan
(74) Attorney, Agent, or Firm—Herbert Dubno; Andrew Wilford

(57) ABSTRACT

A tool or workpiece having a mounting collar centered on an axis and for internally with an axially directed shoulder is mounted on a bolder having a drive sleeve also centered on an axis and fitted coaxially over the collar and a plurality of angularly spaced jaws in the sleeve having axially outer ends each formed with a rearwardly directed face. The jaws are displaceable radially between an outer locking position with their faces bearing axially inward on the shoulder and an inner freeing position with their faces out of engagement with the collar. An axially displaceable actuating member in the sleeve moves the jaws between their inner and outer positions. Axially extending retaining fingers each have a rear end secured in the sleeve and a front end with a rearwardly directed face. The front ends normally lie in an outer holding position with their faces bearing axially inward on the shoulder and the fingers are elastically deformable into an inner releasing position with their faces out of engagement with the collar.

4 Claims, 2 Drawing Sheets

HOLDER FOR COLLAR OF WORKPIECE OR TOOL

FIELD OF THE INVENTION

The present invention relates to a holder for a collar of a workpiece or tool. More particularly this invention concerns a chuck-type fitting adapted to mount a workpiece or tool for rotation for a machining operation, as in a lathe.

BACKGROUND OF THE INVENTION

As described in German patent document 4,138,974 filed Nov. 27, 1991 by E. Brangs a holder used with an element such as a tool or workpiece having a mounting collar for rotation of the tool or workpiece about an axis typically has a drive sleeve centered on an axis and shaped to fit coaxially around the collar. A plurality of jaws are displaceable in the sleeve and engageable with the collar to retain the collar in the sleeve. To this end the collar has an inner surface formed with an axially outwardly directed shoulder and the jaws, which have outer ends inside the collar, are formed with axially inwardly directed faces. An actuating element in the holder can spread the jaws to bring their faces to bear axially inward on the shoulders of the collar, and then retract the jaws inward to pull the collar tight to the sleeve. In this manner the collar is locked coaxially to the sleeve so that the sleeve can be rotated to spin the workpiece or tool carrying the collar.

In an automated process the tool or workpiece is mounted on the drive sleeve by an automatic loader which must hold the tool or workpiece in place until the actuator of the holder has spread the jaws. This represents wasted time, as there must be some overlap between when the loader has fitted the tool or workpiece to the sleeve and when the sleeve's actuator is operated. This time could be more productively used by the loader.

OBJECTS OF THE INVENTION

It is therefore an object of the present invention to provide an improved holder for a tool or workpiece having a mounting collar.

Another object is the provision of such an improved holder for a tool or workpiece having a mounting collar which overcomes the above-given disadvantages, that is which allows the tool or workpiece to be secured to the holder without use of the jaws sufficiently that it can be released by the loader.

SUMMARY OF THE INVENTION

A tool or workpiece having a mounting collar centered on an axis and formed internally with an axially directed shoulder is mounted on a holder having according to the invention a drive sleeve also centered on an axis and fitted coaxially over the collar and a plurality of angularly spaced jaws in the sleeve having axially outer ends each formed with a rearwardly directed face. The jaws are displaceable radially between an outer locking position with their faces bearing axially inward on the shoulder and an inner freeing position with their faces out of engagement with the collar. An axially displaceable actuating member in the sleeve moves the jaws between their inner and outer positions. Axially extending retaining fingers each have a rear end secured in the sleeve and a front end with a rearwardly directed face. The front ends normally lie in an outer holding position with their faces bearing axially inward on the shoulder and the fingers are elastically deformable into an inner releasing position with their faces out of engagement with the collar.

Thus these fingers, which are a simple structure mounted inside the holder, releasably retain the element—tool or workpiece—having the mounting collar on the sleeve. Thus the element can be snapped onto and off the sleeve without ay actuation of the jaws, allowing the holder to be loaded and unloaded rapidly. Only during the actual machining operation when, for instance, the tool or workpiece is being rotated is it necessary to use the jaws to retain it in place on the holder.

According to the invention the sleeve is formed with a radially inwardly open jaw groove and the jaws have axially inner ends seated in the jaw groove. A spring ring radially outwardly presses the jaw inner ends into the jaw groove. Similarly the sleeve is formed with a radially inwardly open holder groove. A ring seated in the holder groove is unitarily formed with the fingers which are angularly interleaved with the jaws. These fingers in accordance with the invention are of triangular section each with a radially inwardly directed corner.

Such construction of the sleeve with adjacent grooves, of which the outer groove holding the jaw inner ends is of larger diameter than the inner groove holding the ring or ring segments carrying the fingers, makes assembly of this holder very simple. In fact the inner end faces of the jaws, which taper axially outward, bear on an outer face of the ring or ring segments carrying the fingers and the latching jaws angularly support the holding fingers.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
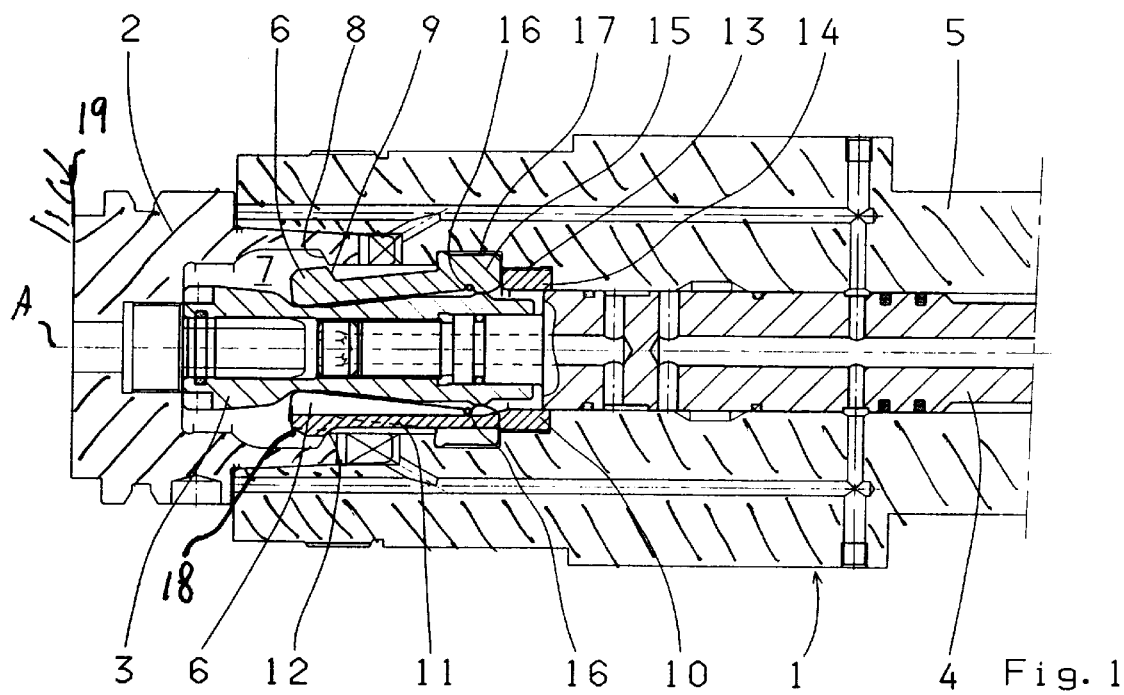
FIG. 1 is a partly diagrammatic axial section through the holder and tool/workpiece in the released condition of the holder.
Figure 3:
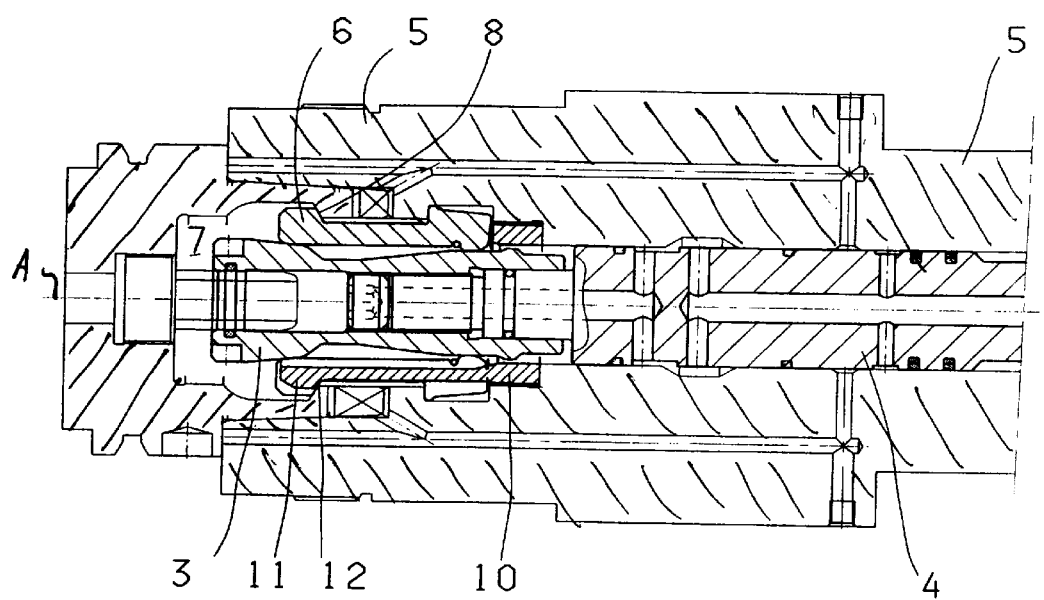
FIG. 3 is a view like FIG. 1 but in the clamping position.

As seen in the drawing a holder 1 much as described in above-cited German patent document 4,138,974 has a drive sleeve 5 that fits around a tubular mounting collar 2 centered on an axis A and forming part of a tool or workpiece 19 adapted to be rotated about the axis A. DIN 69,893 describes the standardized dimensions for the collar 2. An axially reciprocal actuating rod 4 in the sleeve 5 has an axially outer end formed as an outwardly flared head 3 that can pivot a plurality of holding jaws 6. The collar 2 has an axially inwardly open seat or cavity 7 internally formed with a frustoconical outwardly directed shoulder 8 engageable with rear faces 9 of the jaws 6.

There are six such angularly equispaced jaws 6 each having a rear end 13 engaged in a radially inwardly open groove 17 formed in the sleeve 5. A spring ring 16 bears radially outwardly against these rear ends 15 to keep them in the groove 17 and bias the outer ends of the jaws 6 radially inward into the freeing position of FIGS. 1 and 2. The axially outer ends of the jaws 6 are beveled or tapered so as to be narrower at their radially inner faces than at their outer faces. Thus, as is well known in the art, when the head 3 is retracted inward (to the right in FIG. 1), the jaws 6 are spread so their faces 9 engage the shoulder 8 and pull the collar 2 tightly into the sleeve 5.

Figure 4:
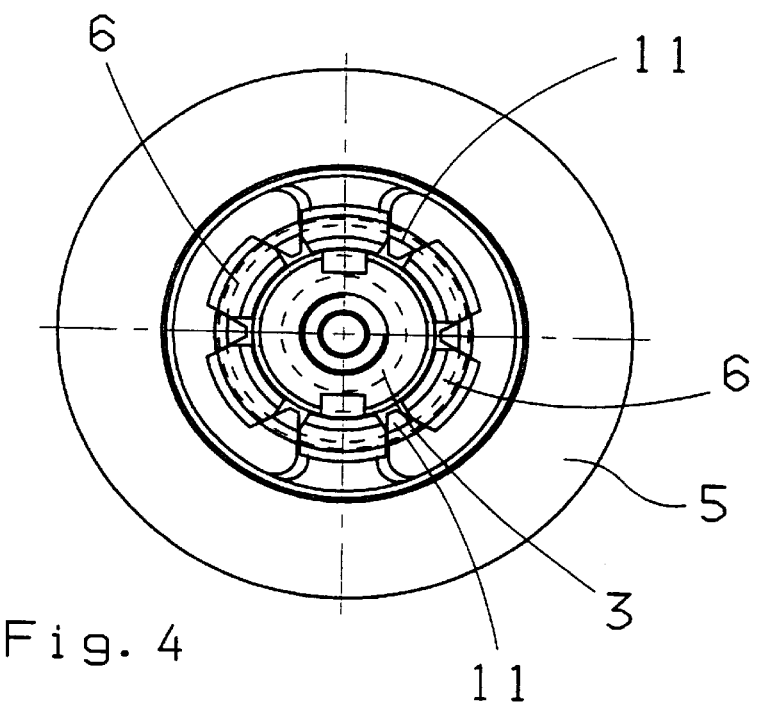
FIG. 4 is an end view of the structure of FIG. 3.
Figure 2:
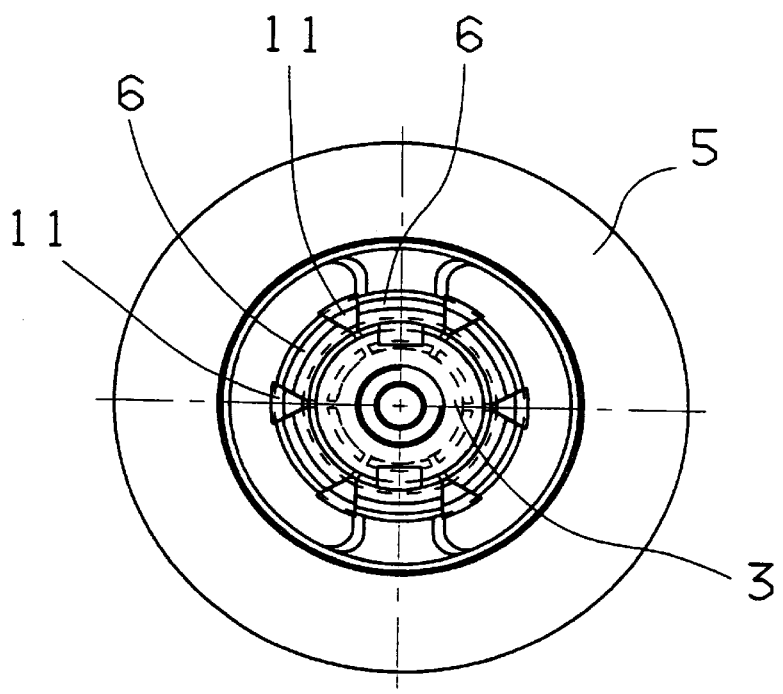
FIG. 2 is an end view of the structure of FIG. 1.

According to the invention a retaining element 10 is comprised of a ring 14 fitted in a radially inwardly open groove 13 immediately behind the groove 17 and six retaining fingers 11 extending axially forward from the ring 14 and having front ends formed with rear faces 12 engageable like the faces 9 of the jaws 6 with the shoulder 8. The element 10 is of an elastically deformable material, for instance steel, and the fingers 11 have beveled outer front ends 18 and are as shown in FIGS. 2 and 4 of equilateral-triangular section, with one apex directed radially inwardly. These fingers 11 alternate with the jaws and their outer ends are radially elastically deflectable.

Thus when the tool or workpiece 19 having the collar 2 is fitted to the sleeve 5, the fingers 11 will to start with be cammed inward, but once the collar 2 is fully seated in the sleeve, they will spring elastically outward and their back faces 12 will engage the shoulder 8 with sufficient force to hold the tool or workpiece 19 having the collar 2 on the sleeve 5. If an automatic loader is used it need therefore merely push the collar 2 into place and can then release it, without having to wait for actuation of the rod 4 to actually lock the collar 2 in place by means of the jaws 6. Similarly the jaws 6 can be retracted radially inward at the end of a machining operation, but the collar 2 will still be held in place to prevent it from falling off the sleeve 5. A firm axially outward pull is all that is needed to free the element 19 from the elastic fingers 11.

I claim:

1. In combination with a tool or workpiece having a mounting collar centered on an axis and formed internally with an shoulder, a holder comprising:

a drive sleeve also centered on the axis and fitted over the collar;

a plurality of angularly spaced jaws in the sleeve having first ends each formed with a face, the jaws being displaceable radially between an outer locking position with their faces bearing on the shoulder and an inner freeing position with their faces out of engagement with the collar;

means including an axially displaceable actuating member in the sleeve for moving the jaws between their inner and outer positions; and a plurality of axially extending retaining fingers each having a rear end secured in the sleeve and a front end with a rearwardly directed face, the front ends normally lying in an outer holding position with their faces bearing on the shoulder and being elastically deformable independently of the jaws via relative axial movement of the tool or workpiece and the drive sleeve into an inner releasing position with their faces out of engagement with the collar.

2. The holder defined in claim 1 wherein the sleeve is formed with a radially inwardly open jaw groove and the jaws have second ends seated in the jaw groove, the holder further comprising a spring ring radially outwardly pressing the jaw second ends into the jaw groove.

3. The holder defined in claim 1 wherein the sleeve is formed with a radially inwardly open holder groove, the holder further comprising a ring seated in the holder groove and unitarily formed with the fingers, the fingers being angularly interleaved with the jaws.

4. The holder defined in claim 1 wherein the fingers are angularly interleaved with the jaws and are of triangular section each with a radially inwardly directed corner.

* * * * *